(No Model.)
J. B. BRADLEY.
SAW HOLDING DEVICE.
No. 288,767. Patented Nov. 20, 1883.
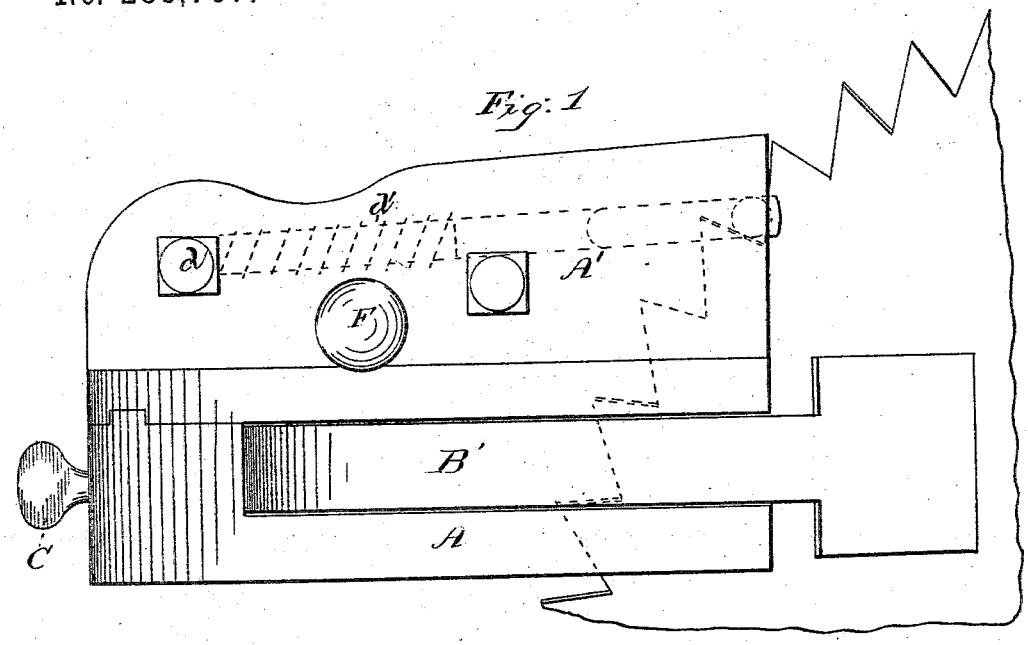
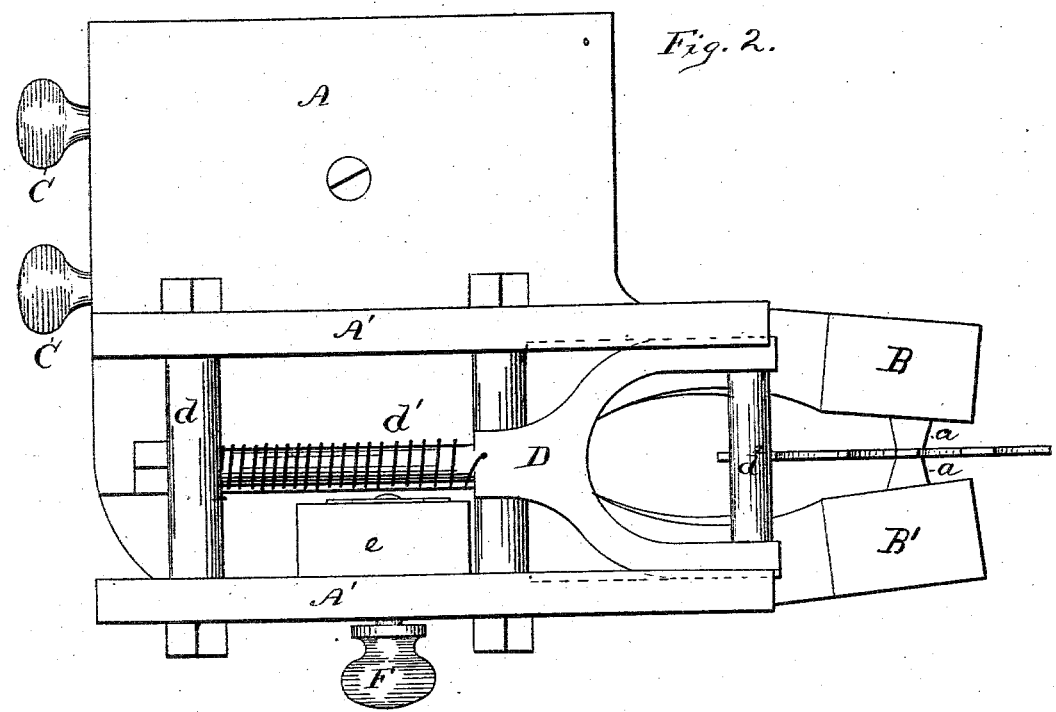
WITNESSES
Chas. R. Burr
W. E. Bowen.
INVENTOR
John B. Bradley
by Myers & Co.
Attorneys.

(No Model.) 2 Sheets—Sheet 2.
J. B. BRADLEY.
SAW HOLDING DEVICE.
No. 288,767. Patented Nov. 20, 1883.
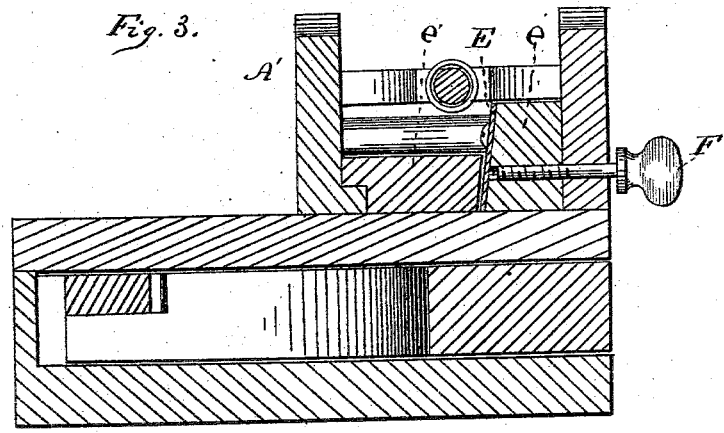
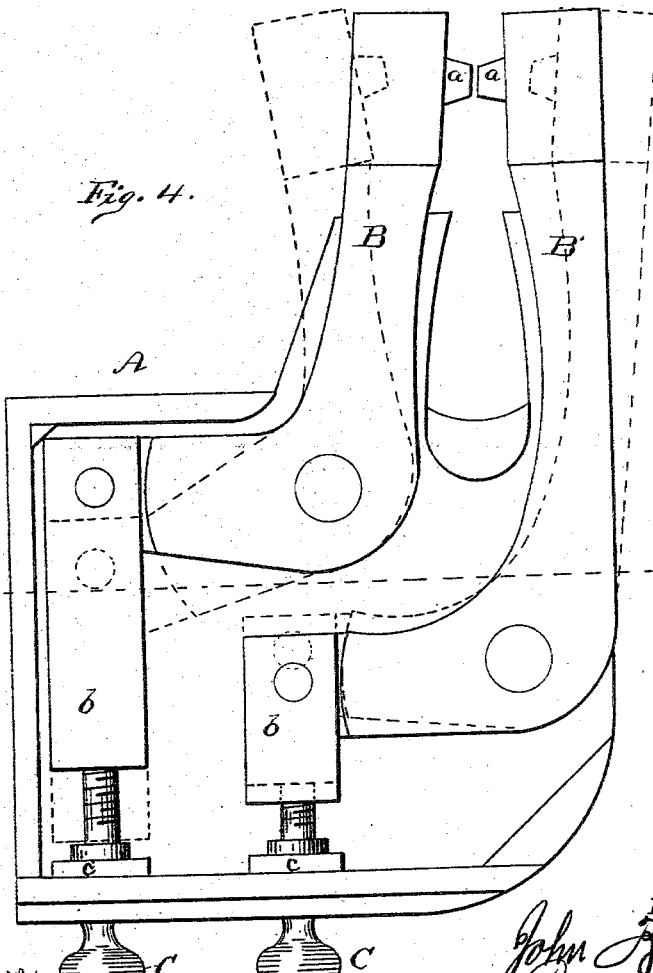
WITNESSES  INVENTOR
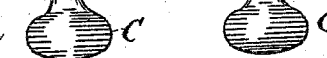
Attorneys.

UNITED STATES PATENT OFFICE.

JOHN B. BRADLEY, OF VANCEBURG, KENTUCKY.

SAW-HOLDING DEVICE.

SPECIFICATION forming part of Letters Patent No. 288,767, dated November 20, 1883.

Application filed June 14, 1883. (No model.)

*To all whom it may concern:*

Be it known that I, J. B. BRADLEY, of Vanceburg, in the county of Lewis and State of Kentucky, have invented certain new and useful Improvements in Saw-Checks; and I do hereby declare that the following is a full, clear, and exact description of the invention, sufficient to enable others skilled in the art to which it appertains to make and use the same, reference being had to the accompanying drawings.

This invention relates to an improvement in a saw-check designed to rigidly hold the saw while sharpening the same, but which may also be employed to guide saws fixed upon their mandrels when at work; but its special object and function is to hold the saw from turning, in order that its teeth may be successively and readily sharpened; and the invention consists of a contrivance adapted to carry out this object, substantially as hereinafter fully set forth and claimed.

In the accompanying drawings, Figure 1 is a side view of my improved combined saw guide and check. Fig. 2 is a plan view. Fig. 3 is a vertical transverse section of the same, and Fig. 4 is a plan view of the saw-guide with the check removed.

In carrying into effect my invention I employ a bottom case, A, preferably of the construction shown, with one side and the outer end left open.

B B' are two jaws consisting of two elbow-levers pivoted in the case A, and having facing studs or projections $a$ $a$, of Babbitt metal. The faces of these studs or projections are slightly beveled, to cause them to stand parallel with the sides of the saw when the jaws have been moved to their nearest point to the saw.

$b$ $b$ are two slides adapted to move longitudinally in the case, and articulated to the short arms of the levers or jaws B B', one of said slides being shorter than the other, as is also the case with the levers or jaws, the slides and levers or jaws of dissimilar lengths being connected together.

C C are oppositely-operating screws working in the slides $b$ of the jaws or levers, and having their bearings in one end of the case A, and provided with shoulders or stops $c$ on the inside of the case, to prevent their endwise movement while being turned by their knobs on the outside of the case to effect the movement of the slides, which in turn cause the jaws or levers to approach or recede from each other, according to the direction of rotation given to the screws in adjusting the jaws toward or away from the saws.

D is the tooth-check, which consists of a forked or two-armed bar or rod, with its rod portion fitted to slide in a cross-bar, $d$, bearing in an upper case, A', secured upon the bottom case, A, the said rod portion being encircled by a spring, $d'$, bearing against the cross-bar $d$, and a shoulder upon the opposite end of the said rod portion, while the forked or two-armed portion is adapted to slide in grooves, as indicated in dotted lines in Fig. 2, in the inner sides of the case A'. The forked portion of the check is provided with a round or cross bar, $d^2$, secured in the outer ends of its arms, the individual function of which (the same being adapted to fit into the coincident throat of the saw-teeth, as exhibited in Fig. 1) is to hold the saw from turning when the filing or sharpening operation is being performed.

The purpose of the spring encircling the rod portion of the tooth-check D is to permit the ready withdrawal of the round or bar thereof from the saw when it is desired to move the saw so as to present another tooth to the action of the file or sharpener, and to permit the automatic forward movement of the check to cause the round to bear against one edge of the next tooth presented. The check is itself held as against accidental withdrawal from and firmly in contact with the saw by means of the clamp-plate E, interposed between the inclined faced block $e$, arranged in the case A', and a block, $e'$, likewise arranged as block $e$, said plate being adapted to bear against an adjunctive portion of the said device, and to be operated by a screw, F, bearing in one side of the case and having a knob on the outside of said case. The check, with its case, is readily removable from the bottom case or the guide by loosening the screw F and sliding it off the same.

I claim and desire to secure by Letters Patent—

1. In a saw-check, the combination, with the jaws B B', pivoted in case A, and having facing-studs $a\ a$, of slides $b\ b$, having screws $c\ c$, tooth-check D, sliding in cross-bar $d$, and spring $d'$, substantially as shown, and for the purpose described.

2. The combination of the clamp-plate E, case A', block $e$, screw F, tooth-check D, having spring $d'$, jaws B B', slides $b$, and screws $c$, substantially as shown, and for the purpose described.

In testimony whereof I affix my signature in presence of two witnesses.

JOHN B. BRADLEY.

Witnesses:
  G. R. SAMPLE,
  R. GREENHOSE.